Feb. 14, 1928.
F. C. OWEN
TRANSFORMER FOR ELECTRIC ARC CUTTING AND WELDING APPARATUS
Filed Nov. 14, 1925
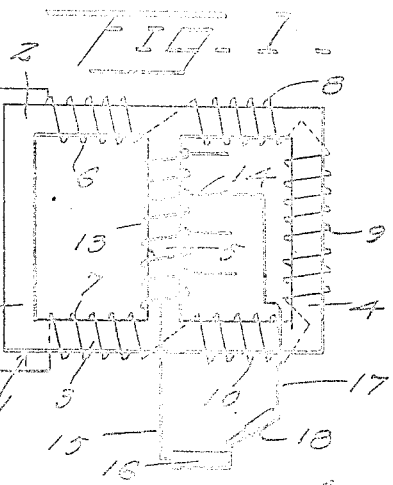
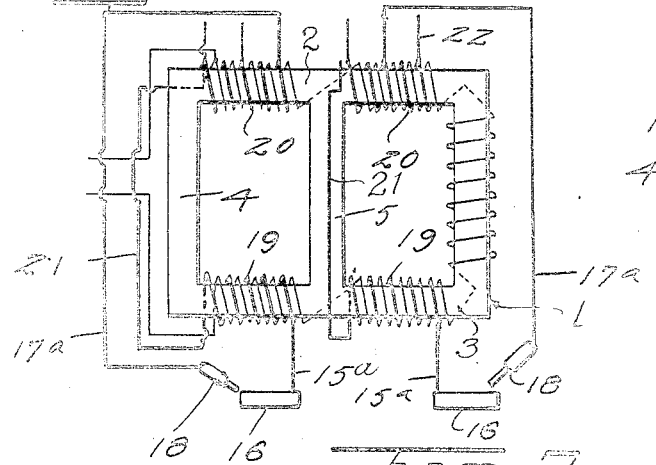
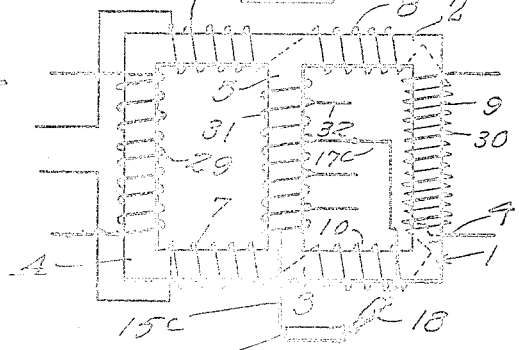
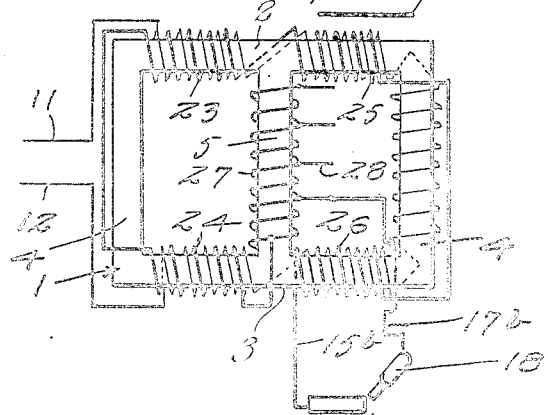
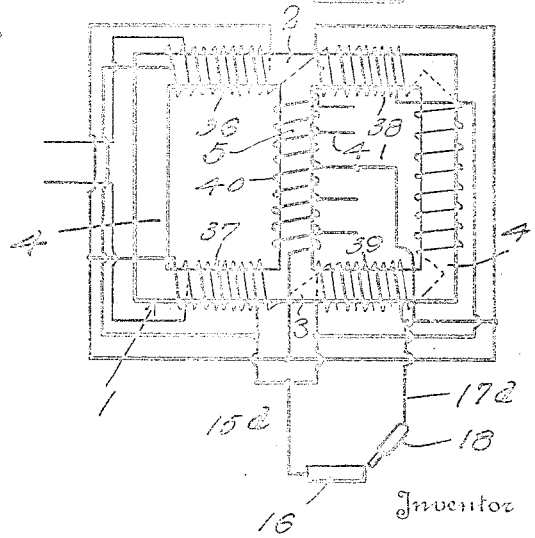
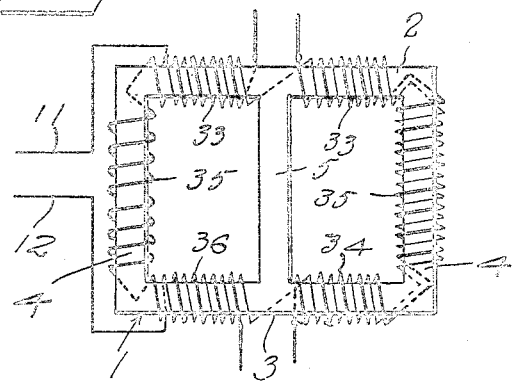
Inventor
F. O. Owen
By
Attorney Patented Feb. 14, 1928.

1,659,469

UNITED STATES PATENT OFFICE.

FREDERICK C. OWEN, OF FAYETTEVILLE, NORTH CAROLINA.

TRANSFORMER FOR ELECTRIC-ARC CUTTING AND WELDING APPARATUS.

Application filed November 14, 1925. Serial No. 69,066.

This invention relates to alternating current electric arc cutting and welding apparatus and more particularly to single phase transformers for such apparatus.

The invention has for one of its objects to improve and simplify the general construction of transformers of the character stated and to provide transformers that shall be so wound and constructed as to obviate the necessity of the use of fans or other mechanical cooling means and the use of flux diverters, damping devices or manually operated resistances and reactances for regulating the current and potential in the primary and secondary windings.

With the foregoing and other objects in view, the invention consists of the novel construction, combination and arrangement of parts hereinafter fully described and claimed, and illustrated in the accompanying drawing, wherein:

Figure 1 is a diagrammatic view of an alternating current electric arc cutting and welding apparatus embodying a transformer constructed in accordance with my invention, Figure 2 is a similar view illustrating a slightly modified form of the transformer, and Figures 3, 4, 5 and 6 are similar views illustrating further modified forms of the transformer.

Corresponding and like parts are referred to in the following description, and designated in all the figures of the drawing, by similar reference characters.

Referring in detail to the drawing, and more particularly to Figure 1, 1 designates a core which is of laminated construction and embodies a top leg 2, bottom leg 3, side legs 4, and middle leg 5.

The primary winding of the transformer comprises a section consisting of coils 6 and 7 mounted on the legs 2 and 3 at one side of the leg 5, and a section consisting of coils 8, 9 and 10 mounted on the legs 2, 3 and 4 at the opposite side of the leg 5. The coils are connected in series, and wires 11 and 12 connected to the coils 6 and 7 extend to the power circuit.

The secondary winding of the transformer comprises a single coil 13 mounted on the leg 5 and provided with taps 14. This coil is connected by a lead 15 to the work 16 which is to be cut, welded or repaired, and any one of the taps 14 is adapted to be connected by a lead 17 to the cutting, repair or welding electrode 18.

In Figure 2 is shown a slightly modified form of the transformer. This transformer is adapted to permit two cutting, welding or repair operations to be performed at the same time. Its core and primary winding are similar to the corresponding parts of the transformer shown in Figure 1. It has two secondary windings mounted on the legs 2 and 3 at opposite sides of the leg 5 and each embodies a main or voltage regulating coil 19 mounted on the leg 3 and an auxiliary or current regulating coil 20 mounted on the leg 2 and connected in series by a wire 21. The coils 19 are connected to the work 16 by leads 15$^a$, and each of the coils 20 is provided with taps 22 any one of which is adapted to be connected to the electrode 18 by a lead 17$^a$. If desired the secondary windings of this transformer may be connected in parallel or series to adapt the apparatus for performing a single cutting, welding or repair operation.

In Figure 3 there is shown a further modified form of the transformer. The core and primary winding of this transformer are similar to the corresponding parts of the transformers shown in Figures 1 and 2. The secondary winding is, however, different, and as shown comprises a section consisting of main or voltage regulating coils 23 and 24 mounted on the legs 2 and 3 at one side of the leg 5, a section consisting of main or voltage regulating coils 25 and 26 mounted on the legs 2 and 3 at the opposite side of the leg 5, and a section consisting of an auxiliary or current regulating coil 27 mounted on the leg 5. These coils are connected in series, and the coil 27 is provided with taps 28. The coil 26 is connected to the work 16 by a lead 15$^b$, and any one of the taps 28 is adapted to be connected by a lead 17$^b$ to the electrode 18.

The core and primary winding of the transformer shown in Figure 4 are similar to the corresponding parts of the transformers shown in Figures 1-3. The secondary winding is, however, different and comprises main or voltage regulating coils 29 and 30 mounted on the legs 4 and an auxiliary or current regulating coil 31 mounted on the leg 5. These coils may be connected in parallel or series, and the coil 31 is provided with taps 32. The coil 31 is connected to the work 16 by a lead 15°, and any one of its taps 32 is adapted to be connected by a lead 17° to the electrode 18.

In Figure 5 is shown a further modified form of the transformer. In this transformer the core and primary winding are similar to the corresponding parts of the transformers shown in Figures 1-4. This transformer has two independent secondary windings each of which consists of coils 33, 34 and 35 connected in series and mounted on the legs 2, 3 and 4 at opposite sides of the leg 5. Any one or two of the coils of each of these windings may be used as the main or voltage regulating coil or coils, and such coil or coils will be connected to the work. The remaining coil or coils of each of these windings will constitute the auxiliary or current regulating coil or coils and will be provided with taps any one of which may be connected to the electrode.

A still further modified form of the transformer is shown in Figure 6. The core and primary winding of this and the other transformers, are similar. The difference between this transformer and the others resides in the secondary winding, and the secondary winding of this transformer comprises a section consisting of main or voltage regulating coils 36 and 37 mounted on the legs 2 and 3 at one side of the leg 5, a section consisting of main or voltage regulating coils 38 and 39 mounted on the legs 2 and 3 at the opposite side of the leg 5, and a section consisting of an auxiliary or current regulating coil 40 mounted on the leg 5. The respective sections of the main or voltage regulating coils 36—39 are connected in parallel, and these sections are connected in series with the auxiliary or current regulating coil 40. The coils are connected by a lead 15ᵈ to the work 16. The coil 40 is provided with taps 41 any one of which is adapted to be connected by a lead 17ᵈ to the electrode 18.

In each transformer, the core provides a plurality of completely closed magnetic paths, the primary winding has a section distributed about the greater portion of one of said paths and a section distributed around a lesser portion of the other of said paths, and the secondary winding is distributed about both of said paths, with the result that when current flows through the primary winding, a constant main voltage and a variable secondary voltage will be induced in the secondary winding. The reaction between these voltages is such that there is induced, in the secondary circuit including the work and electrode, a light current at light load and a heavy current at heavy load, with the result that a stable arc of high power factor may be readily maintained during overhead, vertical and horizontal cutting, welding or repairing of steel, wrought iron, cast iron, malleable iron, aluminum, brass, bronze, copper, and alloy metals. Furthermore, the arc is free from sputtering and spitting, and it has been found that a skilled operator can maintain an arc within one and one-half per cent plus or minus of the rated capacity of the tap with which the electrode is connected.

What is claimed is:—

1. A transformer comprising a core providing a plurality of closed magnetic paths, a primary winding embodying a section distributed around the greater portion of one of said paths and a section distributed around the lesser portion of the other of said paths, and a secondary winding distributed around a plurality of said paths.

2. A transformer comprising a core providing a plurality of closed magnetic paths, a primary winding embodying a section distributed around the greater portion of one of said paths and a section distributed around the lesser portion of the other of said paths, and a secondary winding embodying coils distributed around different portions of said paths.

3. A transformer comprising a core having top, bottom, side and middle legs, a primary winding comprising coils on the top, bottom and one side leg, and a secondary winding distributed around the middle leg.

4. A transformer comprising a core having top, bottom, side and middle legs, a primary winding comprising coils on the top, bottom and one side leg, and a secondary winding having coils distributed around the top and bottom legs.

5. A transformer comprising a core having top, bottom, side and middle legs, a primary winding comprising coils on the top, bottom and one side leg, and a secondary winding having coils distributed around the top and bottom legs at opposite sides of the middle leg.

6. A transformer comprising a core having top, bottom, side and middle legs, a primary winding comprising coils distributed around the top, bottom and one side leg, and a secondary winding embodying coils on the top, bottom and middle legs.

7. A transformer comprising a core having top, bottom, side and middle legs, a primary winding comprising coils on the top, bottom and one side leg, and a secondary winding embodying coils on the top and bottom legs and connected in parallel and a coil on the middle leg and connected in series with said other coils.

8. A transformer comprising a core providing a plurality of flux paths, and primary and secondary windings of which the former embodies a section distributed about the greater portion of one of said paths and a section distributed about a lesser portion of the other of said paths.

9. A transformer comprising a core providing a plurality of closed magnetic paths, a primary winding embodying a section distributed around the greater portion of one of said paths and a section distributed around a portion of the other of said paths, and a secondary winding distributed around a plurality of said paths.

In testimony whereof I affix my signature.

FREDERICK C. OWEN.